United States Patent [19]

Kohy et al.

[11] Patent Number: 5,069,516

[45] Date of Patent: Dec. 3, 1991

[54] TELECOMMUNICATIONS CLOSURES

[75] Inventors: Lowell I. Kohy, Foster City; Damian Kaczorowski, San Mateo, both of Calif.

[73] Assignee: Raynet Corporation, Menlo Park, Calif.

[21] Appl. No.: 439,410

[22] Filed: Nov. 21, 1989

[51] Int. Cl.⁵ .......................... H02G 9/00; G02B 6/00
[52] U.S. Cl. ........................................ 350/96.1; 174/38
[58] Field of Search ............... 350/96.10, 96.20–96.22; 174/38

[56]           References Cited

U.S. PATENT DOCUMENTS

| Re. 27,898 | 1/1974 | Baumgartner | 174/38 |
|---|---|---|---|
| 2,953,625 | 9/1960 | Hasselhorn | 174/60 |
| 3,466,379 | 9/1969 | Lohman | 174/38 |
| 3,531,010 | 9/1970 | Handley et al. | 174/37 |
| 3,557,299 | 1/1971 | Dienes | 174/38 |
| 3,864,510 | 2/1975 | Ramsey, Jr. et al. | 174/38 |
| 4,097,683 | 6/1978 | Summers | 174/38 |
| 4,133,021 | 1/1979 | King et al. | 174/38 |
| 4,183,601 | 1/1980 | Barber et al. | 339/44 |
| 4,243,834 | 1/1981 | Logioco | 174/38 |
| 4,536,611 | 8/1985 | Butler | 174/38 |
| 4,622,436 | 11/1986 | Kinnan | 174/77 |
| 4,631,353 | 12/1986 | Marks | 174/38 X |
| 4,709,980 | 12/1987 | Coll et al. | 350/96.20 |
| 4,884,863 | 12/1989 | Throckmorton | 350/96.20 |

FOREIGN PATENT DOCUMENTS 0823508  11/1959  United Kingdom ................. 174/37

Primary Examiner—Akm Ullah
Attorney, Agent, or Firm—Dennis E. Kovach

[57]            ABSTRACT

An optical fiber enclosure for a pedestal environment includes a pedestal which slideably supports a closure within the pedestal along a vertical direction so that during freeze-thaw envionrmental conditions when the pedestal is raised and lowered by expanding and contracting earth the closure does not impose undue stress on optical fiber cables connected thereto. Another enclosure suitable for buried applications also includes means for slideably extending an inner closure therefrom along a vertical direction to aid a craftsperson in accessing and working on the inner closure, the buried enclosure including means for allowing one or more loops of telecommunications cable to be stored therewithin for allowing the inner closure to be removed a substantial distance therefrom.

8 Claims, 9 Drawing Sheets

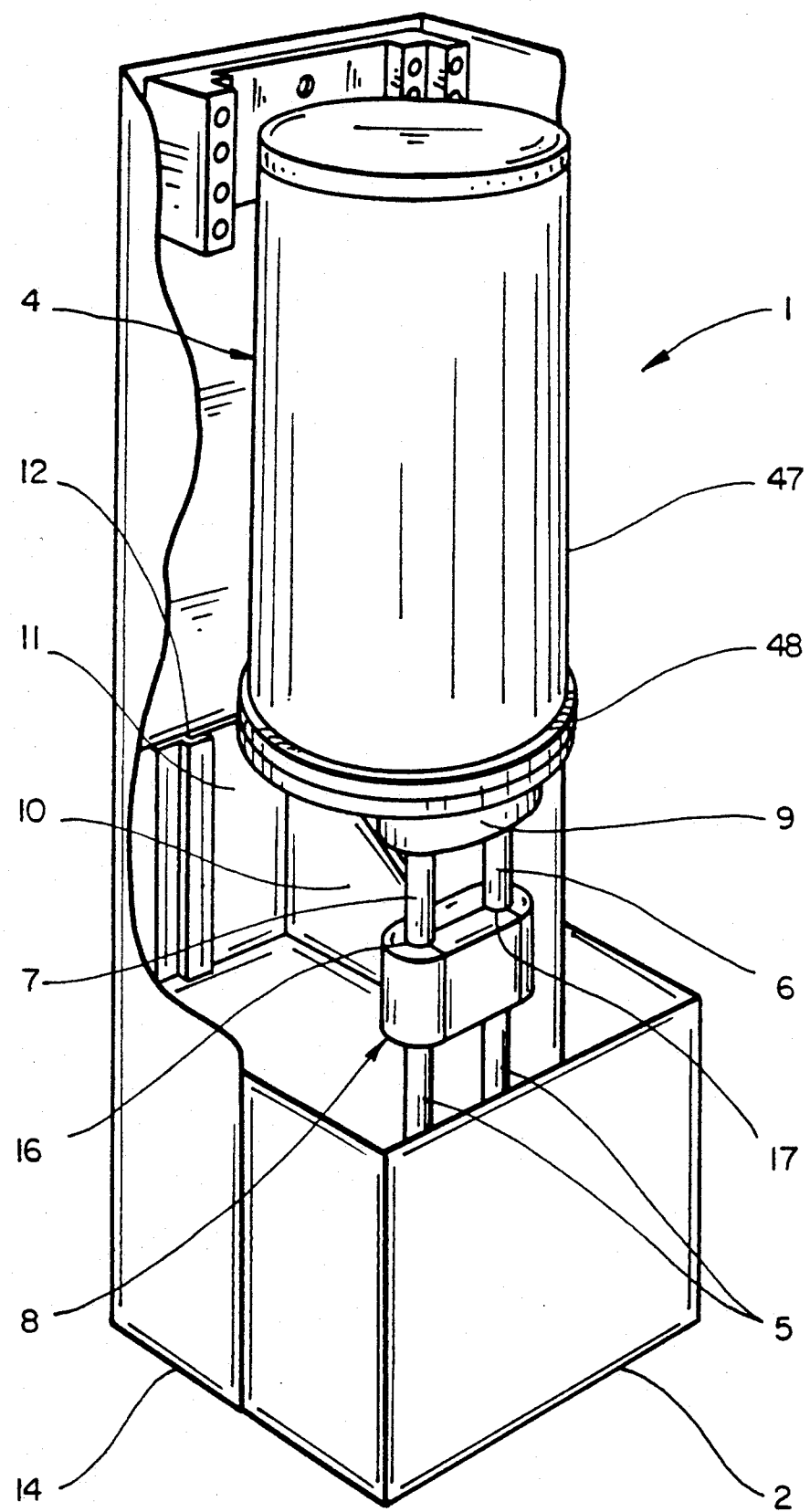
FIG_1

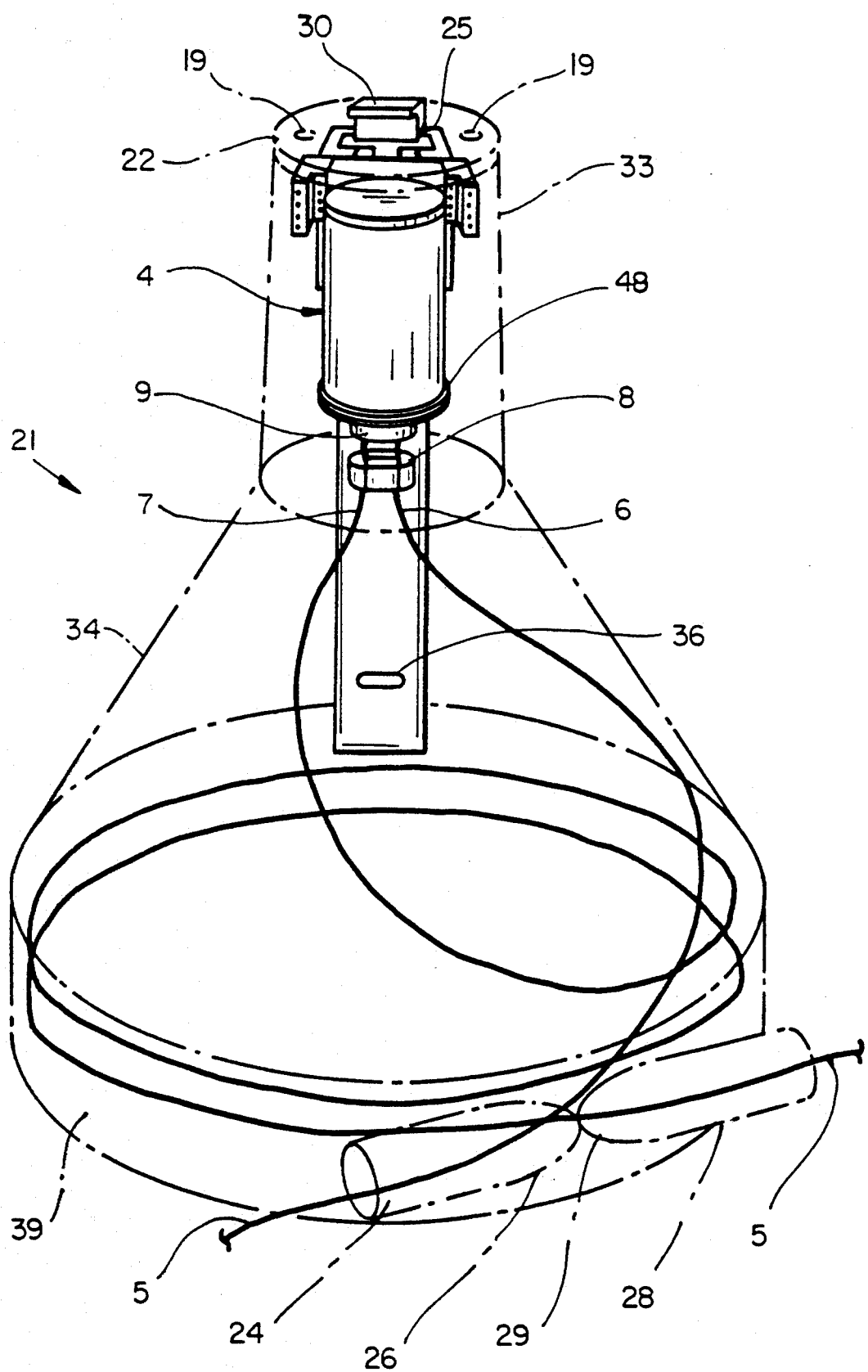
FIG_2

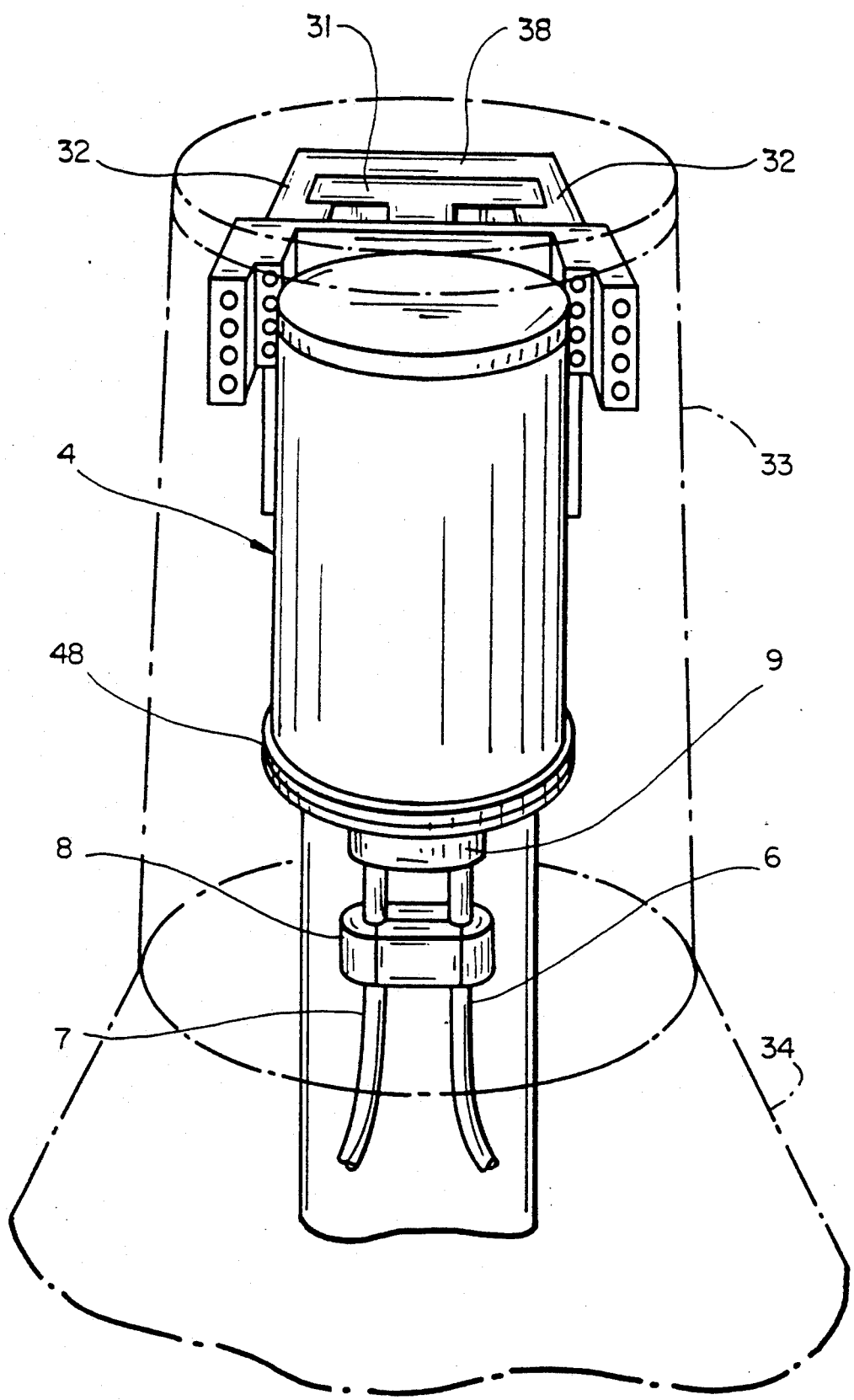
FIG_3

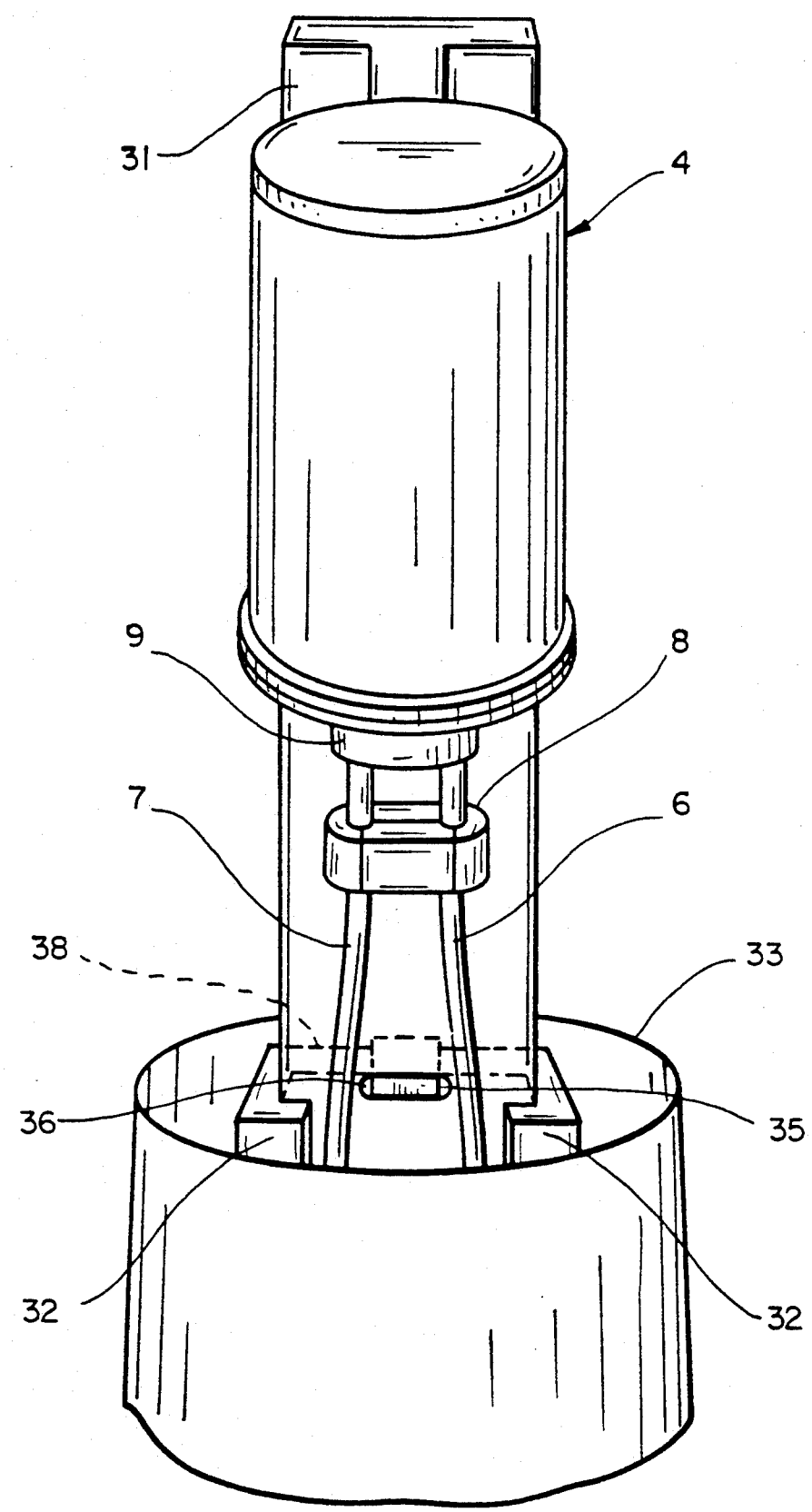
FIG_4

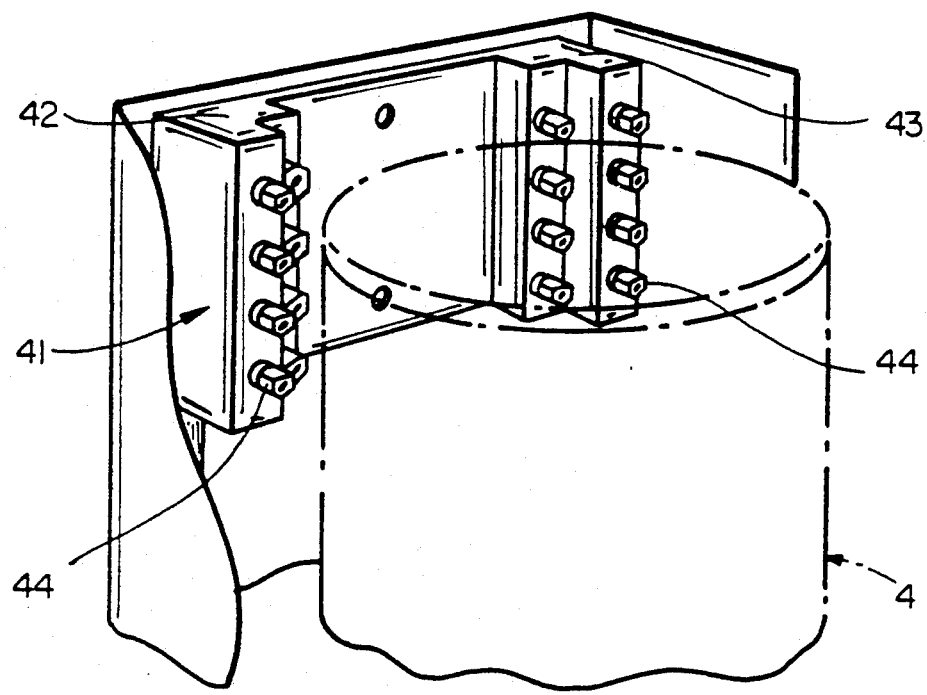
FIG_5
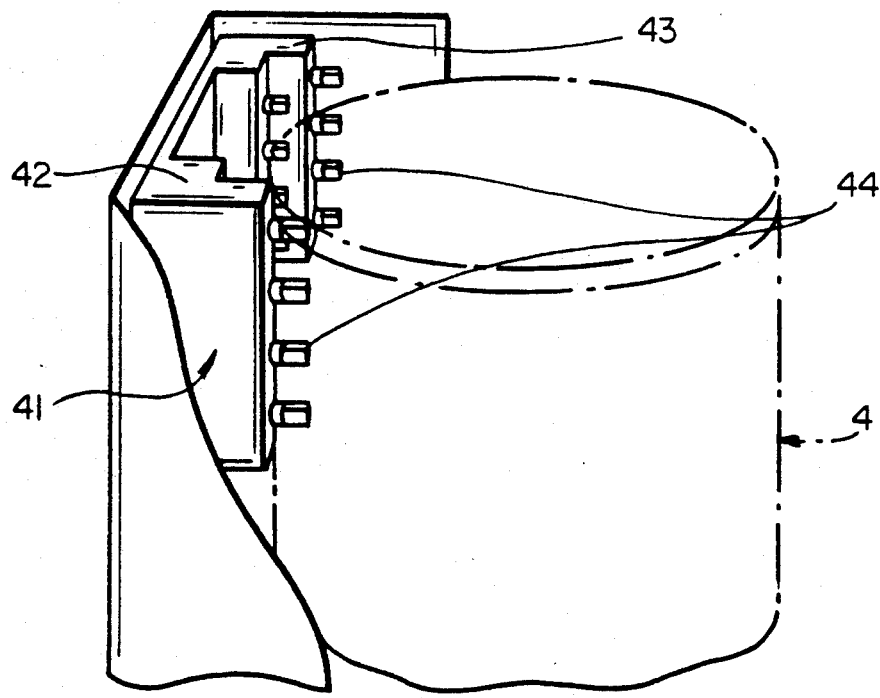
FIG_6

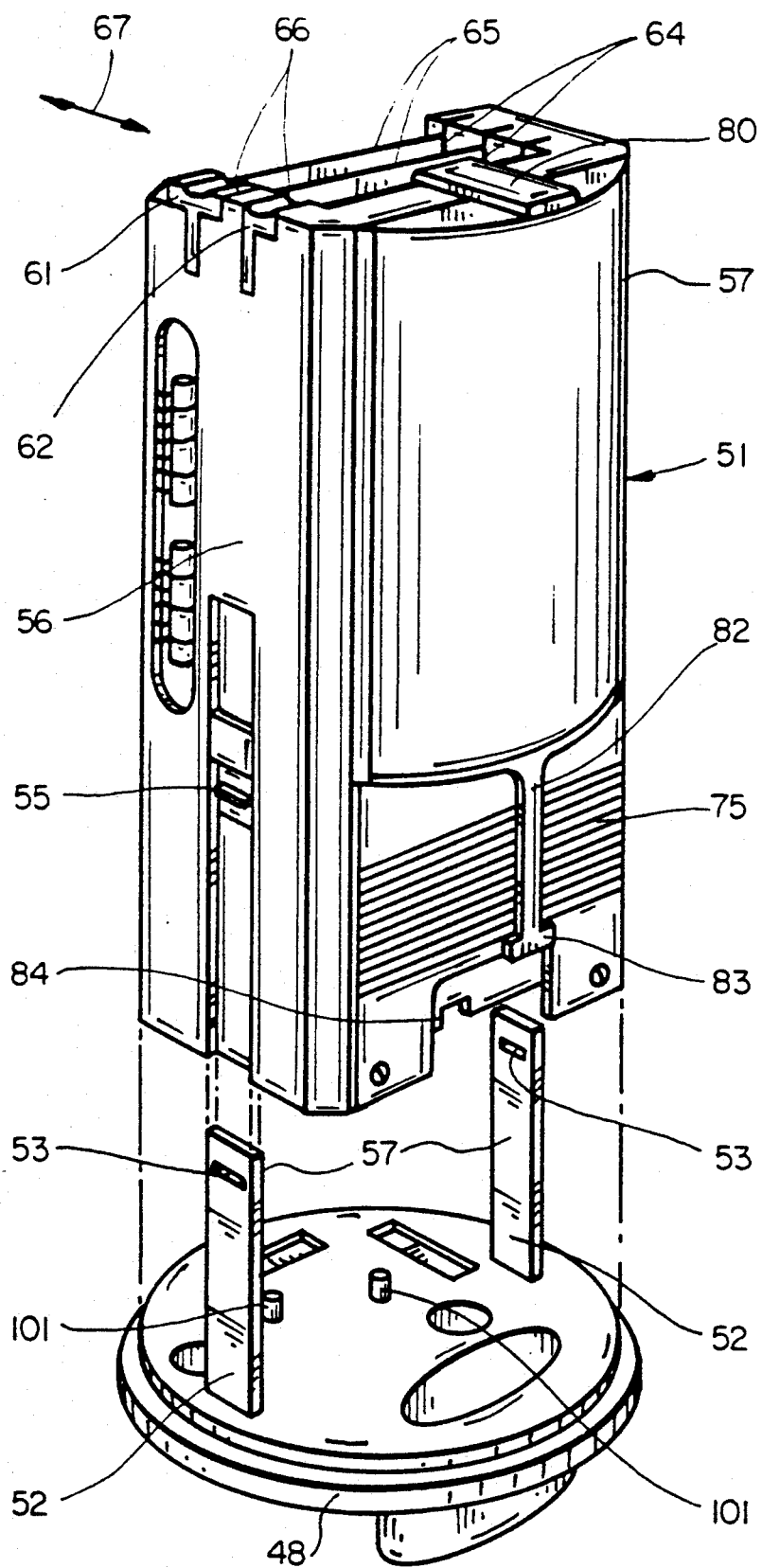
FIG_7

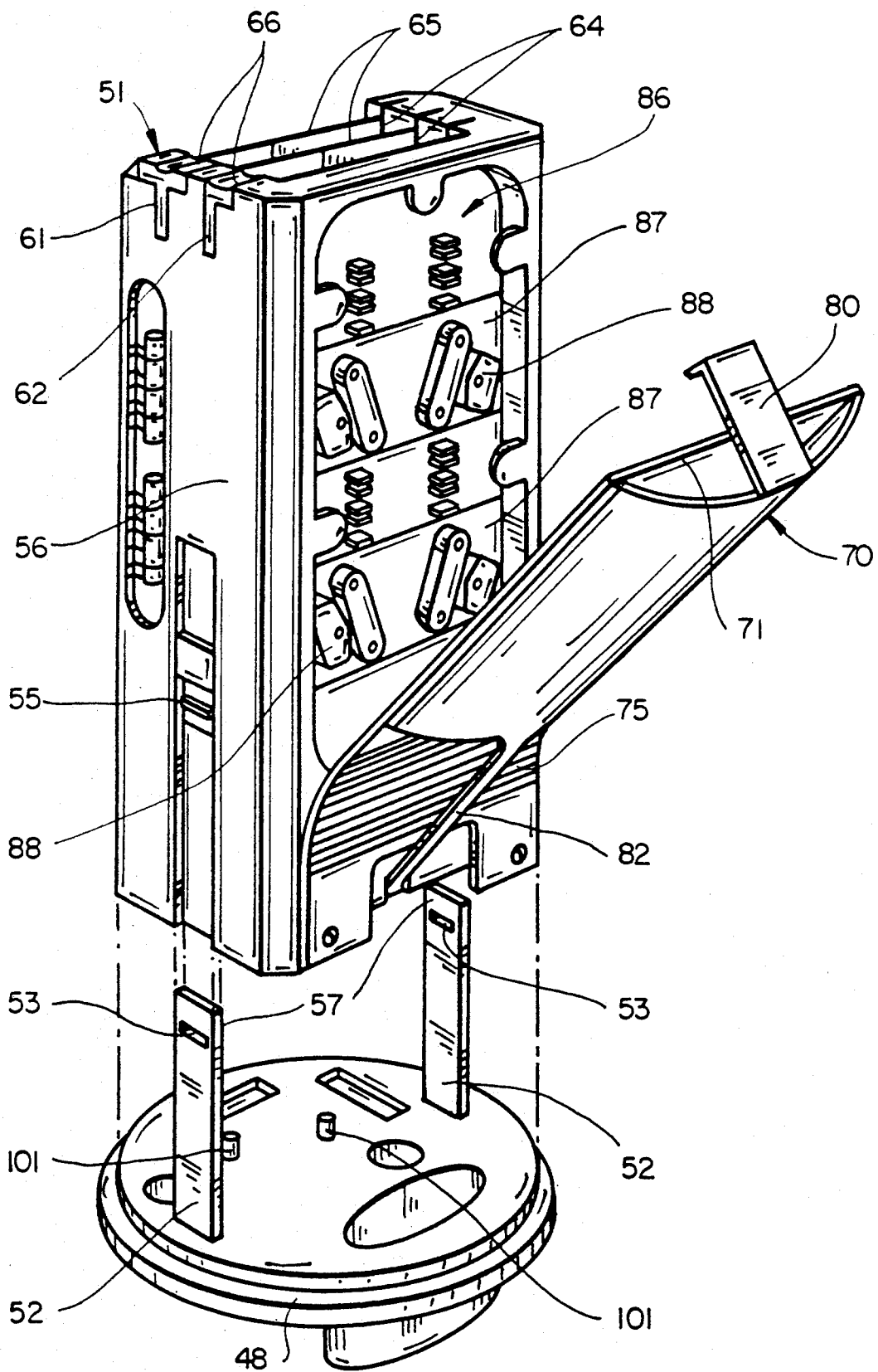
FIG_8

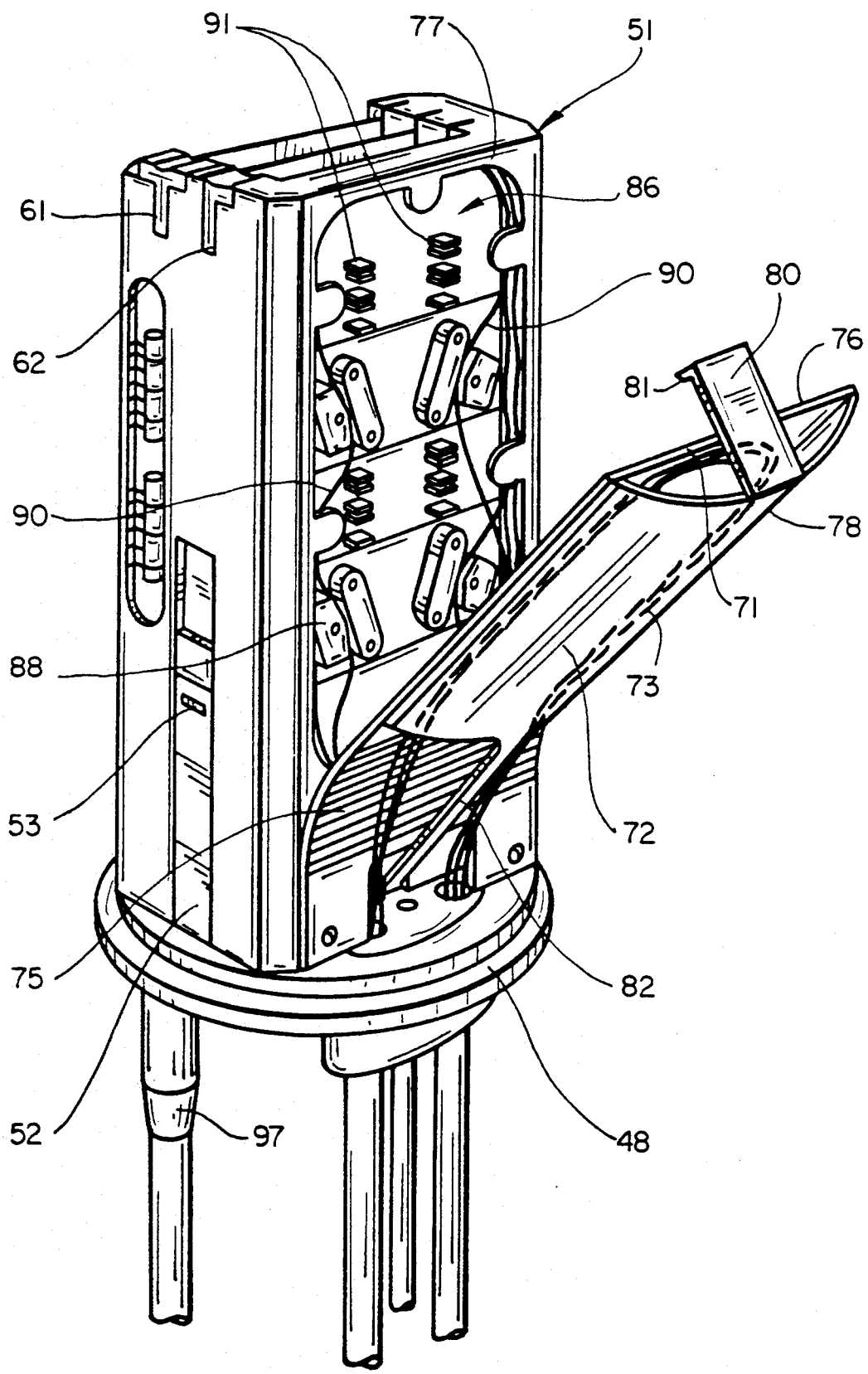
FIG_9

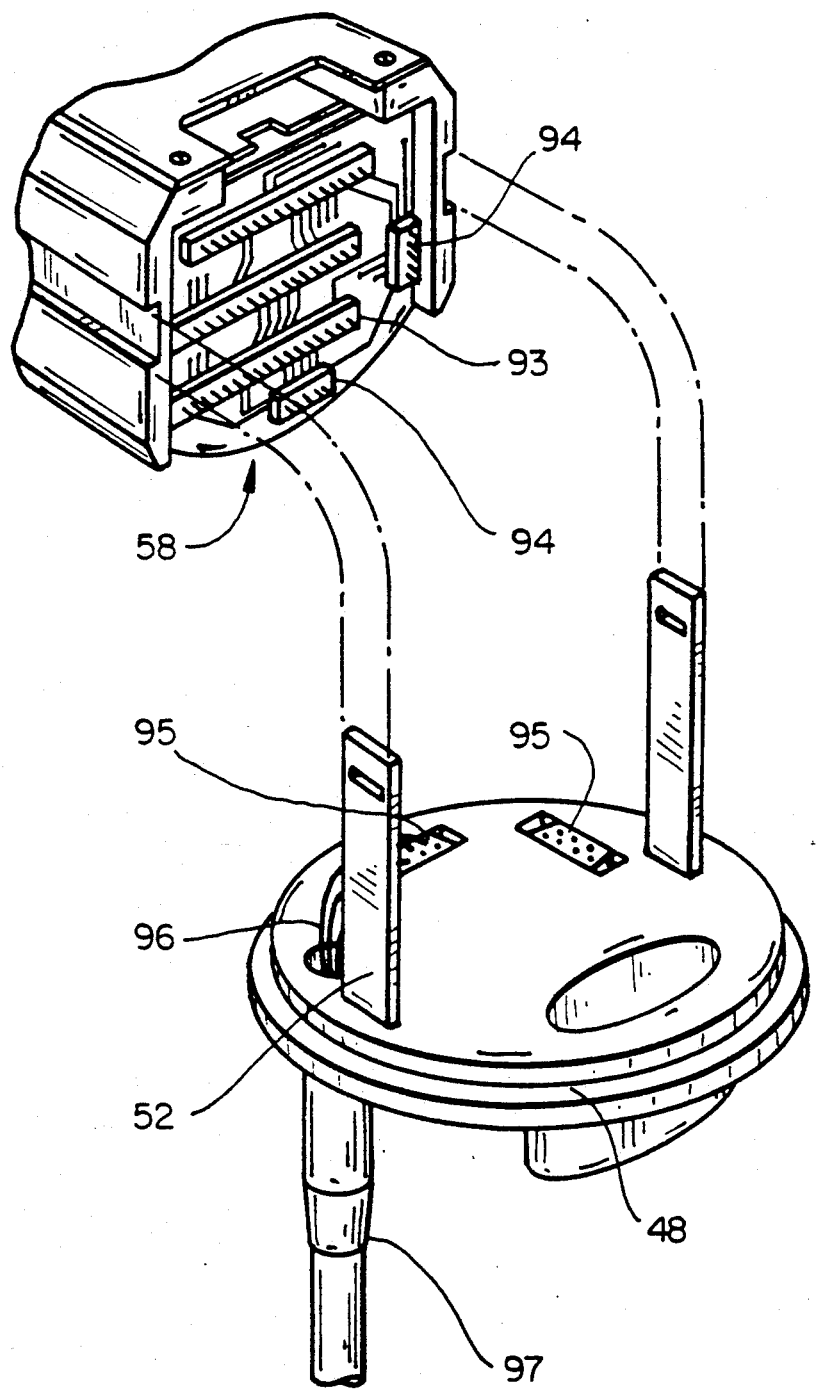
FIG_10

TELECOMMUNICATIONS CLOSURES

CROSS-REFERENCE TO RELATED APPLICATIONS

The present application is related to copending application Ser. No. 07/439,898 entitled "Card Cage" invented by Allen et al. now pending being filed concurrently herewith and assigned to the assignee of the present invention, the disclosure of which is incorporated herein by reference, that application disclosing and claiming various novel features of a card cage illustrated in FIGS. 7-10 hereof, that card cage being preferably useable in preferred closure embodiments illustrated in FIGS. 1-6 hereof, the particular closure embodiments being that which is claimed in the present application.

BACKGROUND OF THE INVENTION

The present invention relates to improved environmental closure constructions and accessories useable for environmentally protecting communication cables, preferably optical fiber cables.

In recent years optical fiber communication networks have gained wide acceptance as opposed to the use of alternate electrical cable systems due to the significantly enhanced bandwidth capabilities available for optical fiber and its immunity to electromagnetic and radiomagnetic interference. Though very significant advantages are achievable by the use of optical fiber rather than electrical conduction media, a continuing problem with the deployment of optical fiber systems relates to how optical fiber cables can be terminated so as to make electrical or optical connections to fibers within the cables and yet adequately environmentally protect the cables and allow for craft friendly installation.

The present invention is directed to various improved constructions for facilitating the termination of optical fiber cables, optically connecting fibers within the cables, protecting optical fibers not to be optically coupled at a subscriber drop point, and environmentally sealing the optical fiber cable after it has been entered for coupling or breakout purposes.

SUMMARY OF THE INVENTION

Accordingly it is an object of the present invention to provide novel and superior means for enclosing telecommunication cables in a easy and convenient manner.

These and other objects of the invention are achieved by the provision of preferred embodiments of a pedestal enclosure and a buried enclosure.

Novel and advantageous features of the invention include the provision of a pedestal which includes means for slideably supporting a closure therewithin along a vertical direction relative to the pedestal so that during freeze-thaw environmental conditions when the pedestal is physically moved in the vertical direction by an expanding and contracting ground surface no excess stress is applied to the telecommunication cable connected to the closure.

A further advantageous feature of the invention is the provision of means for holding first and second segments of a telecommunications cable to be entered outside an entrance and exit location of the closure used for sealing an entered portion of the cable so that a craftsperson can easily work on the entered cable section.

A further feature of the invention is the provision of a novel and advantageous terminal block layout which allows drop wires to be conveniently and easily connected to and disconnected from a terminal block.

Yet a further feature of the invention is the provision of a closure, preferred for buried application, which has a space capsule type appearance comprising three adjacent sections the bottom of which is substantially cylindrical in shape, the middle section of which is substantially conical in shape, and the upper portion of which is substantially cylindrical in shape and has a cylindrical diameter about one-third that of the lowest section. The lowest or bottom section has entrance and exit channels along a wall thereof aligned such that a cable can enter and exit the enclosure along a direction substantially tangent to its cable entrance and exit points, the bottom section being sized so as to be able to accommodate one or more loops of optical fiber cable such that a minimum bend radius of the cable is not exceeded. A first closure housed within the space capsule shaped second closure includes means for being vertically extendable above the upper surface of the buried second closure so as to allow a craftsperson easy and convenient access to the inner first closure, the circumferential loops of the cable stored within the buried closure allowing the first enclosure to be so raised.

These and other advantageous features and aspects of the invention will be further appreciated by reference to the accompanying drawings and detailed description.

BRIEF DESCRIPTION OF THE DRAWINGS

FIG. 1 illustrates a pedestal optical fiber closure according to a first preferred embodiment of the invention;

FIG. 2 illustrates a buried optical fiber closure according to a second preferred embodiment of the invention;

FIG. 3 illustrates an enlarged section of the buried closure illustrated in FIG. 2 and more clearly shows details of a sliding rail and channel arrangement contained therein;

FIG. 4 illustrates a state of the buried enclosure in FIG. 2 where a first closure housed therewithin is vertically extended therefrom for ease of working on cables to be contained within the buried enclosure;

FIGS. 5 and 6 illustrate detailed perspective details of a preferred terminal block of the invention;

FIGS. 7-9 illustrate detailed features of an optical fiber card cage preferably disposable within the closures of FIGS. 1 and 2; and FIG. 10 illustrates details of a preferred test pin arrangement disposed on a bottom of the card cage of FIGS. 7-9.

DESCRIPTION OF THE PREFERRED EMBODIMENTS

FIG. 1 illustrates a first preferred embodiment of the invention. This figure illustrates a pedestal optical fiber closure 1 which includes a pedestal 2 which normally encases and encloses an optical fiber closure 4, a preferred construction of the closure 4 being further described in U.S. application Ser. No. 06/721,527, abandoned in favor of U.S. Ser. No. 110,051, abandoned in favor of U.S. Pat. No. 4,913,522, the disclosure of which is incorporated herein by reference. The pedestal includes a front upper cover, which exposes the closure 4 when removed. First and second optical fiber cable sections 6, 7 of fiber cable 5 are preferably held in place by optical fiber cable holder 8 which is preferably attached to a slideable bracket 10 which has an end face 11 which can slide in a vertical direction within channel 12 located on opposite sides of the end face 11. The holder 8 is preferably a hard rubber material member with first and second apertures 16, 17 which clamp onto and hold the cable sections 6, 7. In FIG. 1, a side portion of the pedestal is shown broken away and the top front cover therefor has been removed to show the contents within the pedestal. The cable sections 6, 7 and 5 are of the type that comprise a plurality of sheaths and preferably at least one shield, the cable having an internal longitudinal strength which is sufficient to normally support the vertical weight of the holder 8, the cable seal 9, the closure 4, the bracket 10, as well as the cable sections 5, 6, 7 within the pedestal 2; the internal longitudinal strength of the cable being aided of course by frictional engagement between the end face 11 and the channels 12.

In use, the pedestal optical fiber closure 1 normally rests on the ground, and the optical fiber cable sections 6, 7 enter the closure 1 from beneath a closure bottom surface 14. Preferably, prior to entering and connecting couplers to optical fibers within the cable sections 6, 7 and securing the couplers within the closure 4, the first and second cable portions 6, 7 are secured to the holder 8 and held by the bracket 10 to facilitate working with the cable by a craftsman. Thereafter, a portion of the cable is stripped of its sheath and shield layers and communication media therewithin, e.g. optical fibers or electrical wires, are separated and coupled to and the stripped cable portion is then entirely sealed within the closure 4. After appropriate coupling is accomplished with fibers or wires within the cable sections 6, 7 and the closure 4 is assembled and sealed, the slideable bracket 10 allows the pedestal optical fiber closure 1 to reliably protect the cable 5 in freeze/thaw environmental conditions. More specifically, in colder months when a ground level beneath the pedestal bottom surface 14 freezes, the pedestal is normally urged upward very gradually over time in a vertical direction. Since the optical fiber closure 4 is totally supported by the slideable bracket 10 and holder 8, the pedestal 2 is allowed to move vertically relative to the closure 4 so as to prevent any undue stress or strain being induced to the fiber cable 5 as the pedestal 2 rises during a freezing period and alternatively falls during a thawing period.

FIG. 2 illustrates an alternate embodiment of the invention whereby reference numeral 21 illustrates a buried optical fiber closure. According to this embodiment, upper closure face 22 is intended to be substantially coplanar with a ground surface and preferably has holes 19 therein for aiding in removing the upper closure face. A remainder of the closure 21 is hence intended to be beneath ground level.

An optical fiber cable 5 enters the closure 21 through a tubular inlet 24 which has an opening which is essentially tangential to a circumferential surface 26 of the closure 21. Similarly, tubular outlet 28 has an end 29 which extends along a direction which is essentially tangential to the circumferential surface 26 which allows the cable 5 to exit the closure 21. Between entering the closure 21 via the inlet 24 and exiting via the outlet 28, the cable 5 is allowed to freely loop around an interior section of the circumferential surface 26, with cable sections 6, 7 extending upward within the closure so as to be enclosed by the closure 4. Again, as in the embodiment of FIG. 1, a cable holder 8 is preferably used for holding the first and second cable sections 6, 7 to facilitate working on an intermediate cable section prior to enclosing same within the enclosure 4 during cable installation. In this embodiment, normal gravitational support for the closure 4 is provided by the interengagement of a lower substantially flat surface 25 of a handle 30 and an upper substantially flat surface of a back member 38 which interconnects rails 32, the handle 30 being shown only in FIG. 2 and omitted in FIG. 3 for purposes of clarity. Accordingly, to vertically raise the closure 4 from the closure 21, a craftsman simply grabs the handle 30 with his fingers and lifts upward thus causing plate 31 to slide within rails 32. Preferably, the closure 21 has holes (not shown) for drop cables to enter and exit at any convenient location.

To facilitate working on this intermediate cable section during a field installation procedure, according to the invention the closure 4 is slideable mounted to the closure 21 via the slideable plate 31 which is slideably within the closure rails 32, the plate 31 being secured to the closure 4, as illustrated in FIG. 3. Accordingly, to easily work on the closure 4 all a craftsman needs to do is raise the closure 4 vertically due to the sliding interengagement of the plate 31 and rails 32 so that the closure 4 resides an appropriate distance above ground level, and secure the closure 4 thereat with a suitable pin 35 disposable in pin slot 36 or other support means, as illustrated in FIG. 4, a part of the pin the being wedges against the member 38. As illustrated in FIG. 2, preferably the buried optical fiber closure 21 includes a substantially cylindrical section 33 which rests above and is integrally connected with a substantially conical section 34 which is connected to a cylindrical base section 39.

FIGS. 5 and 6 illustrate two perspective views of a preferred terminal block construction illustrated in FIGS. 1 and 2. According to these figures, a terminal block 41 includes first and second sets of terminals arranged in rows and located adjacent to opposite side ends of the pedestal or closure, e.g. either the pedestal closure 1 or the buried closure 21. Preferably, each terminal set 42, 43 includes first and second adjacent rows of terminals, as illustrated, with the rows being recessed relative to one another, as illustrated. Such a construction allows for, in the example illustrated, 16 terminal connections to be made with the 16 individual terminals 44 for connecting to electrical dropwires which are connected within the closure 4. Stacking and offsetting the sets of terminals as illustrated allows the terminals to be most easily accessible to a craftsman while allowing minimum interference to occur between the closure 4 and the various terminals 41 so as to facilitate installation and connection of the closure 4. Alternate placement of the terminals is possible, one such location would be adjacent the base plate 48 and the terminals could be connected to the base plate as well.

Referring back to FIG. 1, the closure 4 includes a dome 47 connectable to the closure base plate 48. Within the dome 47, as illustrated in FIG. 7, is contained card cage 51, preferably for housing optical and electrical components, the cage being releasably securable to the base plate 48 via engageable and disengageable spring clamp tines 52 which have a longitudinal slit 53 near an upper end thereof which is engageable with a protruding rail 55 which protrudes from opposite sides 56, 57 of the card cage 51. According to this construction, the card cage 51 and tines 52 are sized such that the tines 52 must be resiliently urged outward away from each other to allow the card cage rails 55 to ride over and down an inner side surface 57 of the spring clamps 52. The rails 55 mate within the longitudinal slits 53 near the top of the tines 52, the tines being guided by channels formed on exterior surfaces of the card cage housing. Accordingly, this construction allows for the card cage 51 to be easily attachable to the closure base plate 48 without requiring the use of bolts, screws, or other cumbersome items by a craftsman.

A further novel feature of the card cage 51 is the provision of integrally molded spring clamps 61, 62 preferably located on one of the sides 56, 57 of the card cage at an upper end thereof, as illustrated in FIG. 7. The card cage 51 has a plurality of opposing vertically oriented longitudinal channels 64 which slideably guide and hold various boards or cards 65 within the card cage 51. Each card or board 65 can preferably have mounted thereon electronic and/or optical circuitry and power modules as necessary for operation of various electro-optical components to be housed within the card cage 51. Specifically, according to a preferred embodiment, boards 65 could have mounted thereon circuitry for providing digital-to-analog and analog-to-digital operations, power and power conversion operations, packet assembly and disassembly functions, etc. Upper side ends 66 of the spring clamps 61, 62 are precisely positioned over an approximate top of longitudinal channels 64 so as to normally contain the cards 65 within the channels 64 and keep them from being inadvertently removed from the card cage 51. Upon sidewards deflection of the spring clamps 61, 62 along a direction of the arrows 67 an end 65 of the spring clamps 61, 62 is deflected off center from an upper edge of its respective longitudinal channel 64 so as to allow a board 65 to be inserted or removed from its respective longitudinal channel pair 64. Since the spring clamps 61, 62 are integrally formed by molding with a material which otherwise forms the housing of the card cage 51, the described construction provides for a cost efficient closure which is easily manufacturable and which is easily useable by a craftsman since use of external removeable clamps is not required, or any other separate securing or clamping means for that matter which can easily be dropped.

FIG. 8 shows yet further features of the invention, this figure showing the card cage 51 in an attitude whereby an end face 70 has been deflected from a body of the card cage. As FIG. 9 shows, the end face 70 comprises a tray 71 which contains an optical fiber or fiber tube storage surface 72 thereon for accommodating and storing bare optical fibers or optical fibers housed loosely within tubes 73, the bare fibers or loose tube fibers not being optically or electrically connected to components within the card cage 51. Hence, these fibers and/or tubes are expressly routed.

In the embodiment of FIG. 9, a loose tube fiber configuration is actually illustrated, these tubes being typically used in optical fiber cable constructions of the type wherein the fibers are loosely contained within tubes which are then environmentally sealed by various cable layers therearound. Other typical optical fiber cable constructions, such as a slotted core type, contain bare optical fibers typically helically wound within slots of a core of a cable, the slots and fiber then being environmentally sealed by various cable layers therearound. In either case, the card cage 51 is useable with such cables, and in the case of the loose tube cable type, it preferably would be the loose tubes which are expressly routed within the surface 72 of the tray 71; and in the case of the slotted core cable it would be bare buffered fibers which are routed within the surface 72 of the tray 71. Optionally, with bare fibers from a slotted core, the express fibers could be stored in coupler tray 86. A typical optical fiber cable may contain somewhere of the order of 10-200 individual fibers therein, and it may only be desirable or necessary to optically couple to only a fraction of the fibers within the cable. Accordingly, fibers or fiber tubes not optically coupled to need to be routed within the closure 4 in a easily convenient manner, which is a function of the storage tray 71. In addition, the tray 71 could hold fiber splices, connectors, etc.

Another particularly advantageous feature of the storage tray 71 is the provision of essentially a plurality of horizontally aligned ribs or corrugations 75 which are separated from one another in a vertical direction as illustrated in FIGS. 7-9. The corrugatins are sized and spaced such that upon deflecting an upper part 76 of the storage tray 71 away from an upper part 77 of the card cage as illustrated in FIG. 9, a minimum bend radius of any fibers or fiber tubes being expressly routed within the storage tray 71 is not less than a minimum bend radius specified for the optical fibers. The parallel ribs thus form an elongated flexible and resilient hinge. Preferably, the storage tray 71 further includes an outer concave shaped cover 78 which further protects the fibers or tubes 73, the outer cover 78 preferably but not necessarily being transparent.

A further advantageous feature of the storage tray is the provision of an integrally molded and formed attaching member 80 which has a hook end 81 which can snap attach to a body of the card cage 51 and keep the storage tray secured thereto so as to form an environmental dust cover for an optical coupler tray 86. Another feature of the storage tray 71 is the provision of a second attaching member 82 which has a bottom end 83 (FIG. 7) which has a T-construction which is engageable with a mating T-slot 84 formed in a bottom surface of the card cage 51. Optionally, the slot 84 could be an aperture in the wall of the card cage rather than in a side edge thereof. The provision of the second attaching member 82 allows the storage tray 71 to be positively and naturally secured in an open position so as to allow a craftsman easy and convenient access to the optical coupler tray 86 when installing optical fibers therein as to be further explained below. After the optical fibers to be coupled are appropriately mounted within the optical fiber coupler tray 86, the T-shaped bottom end 83 is disengaged from its T-slot 84 and the hooked end 81 of the attaching member 80 is firmly secured to the card cage body so as to environmentally seal the optical coupler tray 86. A preferred construction of the member 82 and mating slot 84 is to allow the storage tray to be passively rotated and held away from the card cage body by an angle in excess of 45°, 50°, 60°, 75°; at least in excess of 30° or 40°, relative to a vertical axis of the card cage, with the hinge resiliently urging the tray 71 toward the tray 86 and towards an express fiber storage attitude where the angle is thus 0°. Optionally the angle is about 75°.

The optical coupler tray 86 includes a plurality of optical coupler modules 87 on which are mounted one or more optical couplers 88. Preferably, the optical couplers have a construction as described in copending application Ser. No. 07/344,778 and assigned to the assignee of the invention, the disclosure of which is incorporated herein by reference. Specifically, preferably the couplers couple light between an electro-optic transducer, e.g. emitter or detector, and a core of a fiber by passing the light through a side of a fiber cladding and buffer. Optical fibers 90 which are to be optically coupled are inserted into an appropriate optical coupler 88 so as to form a bend in the optical fibers 90 which allows light to either be coupled into or coupled out of a core of each coupled optical fiber, as more fully explained in U.S. application Ser. No. 344,778, a bend radius within the coupler being far less than a minimum bend radius of the fiber, e.g. typically in the range of 2 mm to 15 mm. Preferably, a plurality of attachment sections 91 are provided which can accommodate optical fiber connectors or optical fiber splices which may be formed in the optical fibers 90 as can be necessary if one or more optical fibers 90 are inadvertently broken and thus required to be spliced or connected.

FIG. 10 illustrates yet a further feature of the invention whereby a bottom surface 58 of the card cage 51 has a plurality of electrical test pins 93 extending in three adjacent vertical rows and extending from the bottom surface 58. Additional electrically connecting pin sets 94 are provided, these being engageable with mating electrical pin connectors 95 disposed on an upper surface of the base plate 48. Accordingly, when the card cage 51 is attached to the base plate 48, the electrical pin sets 94 mate with the electrical pin connectors 95 and provide electrical communication to a plurality of electrical dropwires 96 which then exit the closure 4 via conduit 97 and are terminated on various ones of the electrical terminals 44 illustrated in FIGS. 5 and 6. The significance of the electrical pin sets 93 is that they provide an easy, reliable, and convenient means of testing an electrical integrity of the card cage, cards, optical couplers, optical fibers, and other electronic components being housed within the card cage 51 at the time of its manufacture and prior to shipping for installation. Finally, FIG. 7 shows a preferred optional feature whereby posts 101 are provided in the base plate 48 for guiding the card cage into alignment with the base plate, the card cage bottom surface having mating post holes therein. Optionally, such post holes, not shown, are electrically connected to the backplane, and the posts 101 are electrically conductive and act as a ground for the card cage.

Though the invention has been described by reference to certain preferred embodiments thereof, the invention is not to be so limited and is to be limited only by the appended claims.

What is claimed is:

1. A pedestal enclosure for sealing a telecommunication cable, comprising:
   a closure for sealingly enclosing a portion of a telecommunication cable;
   a pedestal surrounding the closure and having a bottom surface in contact with a ground surface, the pedestal including means for supporting the closure therein so as to allow the closure to be passively slideable along a vertical direction relative to the pedestal and the ground surface;
   the supporting means comprising a bracket fixably attached to the closure, and rail and channel means connectable to the bracket which allow the bracket to slide along the vertical direction relative to the pedestal.

2. The enclosure of claim 1, the supporting means further including first and second sections of the cable, the cable having an internal longitudinal strength sufficient to vertically support the closure with the aid of the bracket and the rail and channel means.

3. The enclosure of claim 1, the bracket being T-shaped with a T-portion thereof forming rails.

4. The enclosure of claim 1, further comprising means for holding first and second segments of the cable outside an entrance and exit location of the closure in a vicinity of the supporting means so as to allow an intermediate portion of the cable between the segments to be conveniently accessed.

5. The enclosure of claim 4, the holding means comprising a hard rubber member having first and second apertures for holding the first and second cable sections, the rubber member being attached to a bracket.

6. The enclosure of claim 1, further comprising a terminal block attached to an upper inside planar wall of the pedestal, the terminal block having first and second sections adjacent opposite vertical edges of the wall, each terminal block section having first and second adjacent rows of electrical terminals.

7. The enclosure of claim 1, the telecommunications cable including optical fibers therein.

8. A terminal block connection, comprising:
   a planar terminal block wall;
   firs and second sets of terminals disposed on opposite sides of an upper portion of the wall, each set including first and second vertically aligned rows of terminals connectable to electrical wires;
   a cylindrical closure for sealing portions of the wires leading from the terminals, a cylindrical axis of the closure being substantially parallel to the aligned rows of terminals, the terminal rows being disposed on opposite sides of the closure.

* * * * *

UNITED STATES PATENT AND TRADEMARK OFFICE
CERTIFICATE OF CORRECTION

PATENT NO. : 5,069,516

DATED : December 3, 1991

INVENTOR(S) : Kohy, et al

It is certified that error appears in the above-identified patent and that said Letters Patent is hereby corrected as shown below:

On the title page, Item 19, line 2, delete "Kohy" and insert therefor --Koht--: Item [75] delete "Kohy" and insert therefore --Koht --.

Column 8, line 43, delete "firs" and insert therefor --first--.

Signed and Sealed this

Thirtieth Day of March, 1993

Attest:

STEPHEN G. KUNIN

Attesting Officer

Acting Commissioner of Patents and Trademarks